April 11, 1933.   H. F. TOL   1,903,691
IRONING MACHINE
Filed March 3, 1931   2 Sheets-Sheet 1

INVENTOR
H.F. Tol.
By: Marks & Clerk
Attys.

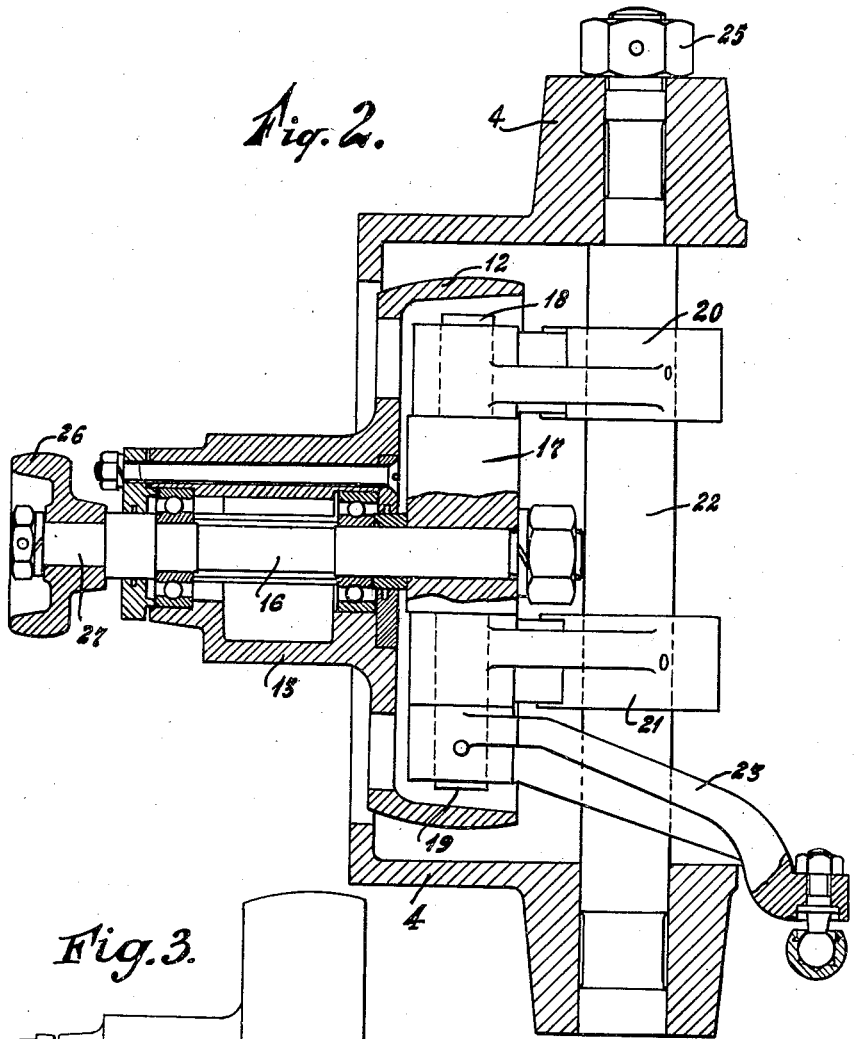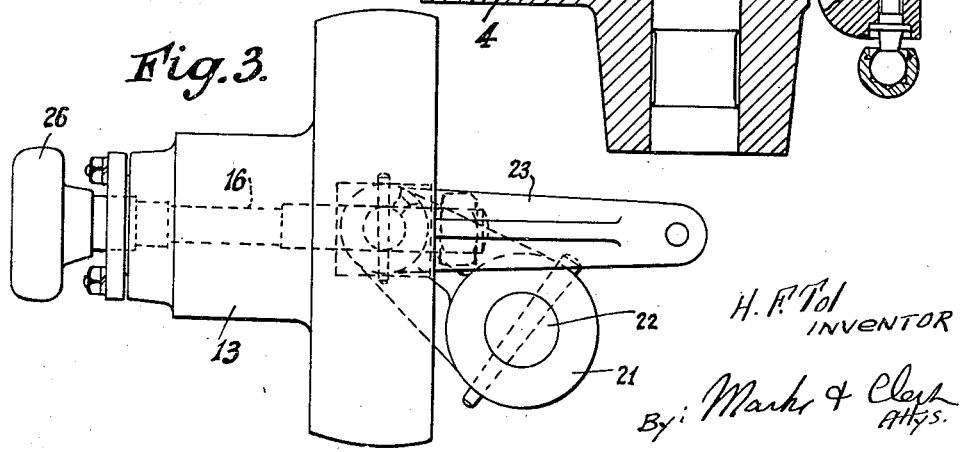

Patented Apr. 11, 1933

1,903,691

UNITED STATES PATENT OFFICE

HERMANUS FRANCISCUS TOL, OF THE HAGUE, NETHERLANDS, ASSIGNOR TO NAAMLOOZE VENNOOTSCHAP: VENNOOTSCHAP TOT EXPLOITATIE VAN STRIJK-EN PERSMACHINE OCTROOIEN (V. E. S. P. O.), OF THE HAGUE, NETHERLANDS, A CORPORATION OF THE NETHERLANDS

IRONING MACHINE

Application filed March 3, 1931, Serial No. 519,307, and in Great Britain March 14, 1930.

The invention relates to power operated ironing machines of the type in which the iron is carried by a support movable along a guide, in a direction parallel to the ironing table, the intermittent reciprocatory motion of the iron being obtained by a driving wheel or roller, adapted to be brought into contact, at will, with and to roll along one or other of two tracks, positioned one on each side of the axis of said wheel.

The object of the invention is to provide improved means for effecting and controlling the reciprocatory motion and it mainly consists in the driving wheel or roller being concentrically attached to, or made integral with, a pulley driven by the power means, the shaft of said pulley being pivotally mounted while means are provided for tilting said pulley-shaft in a plane perpendicular to said tracks for the driving wheel or roller.

In order to have the motion automatically stopped as soon as the iron has reached the end of the table in either direction the pulley shaft according to the invention may be provided with a roller or equivalent, cooperating with a running surface or ramp for the same at each end of the guide. As soon as said roller comes into contact with and rides on one or other of said running surfaces or ramps, the pulley shaft is moved and automatically brought into a position in which the driving wheel or roller is clear of both its tracks so that it no longer moves the iron.

The accompanying drawings illustrate the invention by way of example.

Fig. 1 is a vertical cross section of the machine.

Fig. 2 is an enlarged section of the line II—II in Fig. 1.

Fig. 3 is a side view of the pulley and driving wheel with its tilting mechanism.

Fig. 4 is a sectional view on line 4—4 of Fig. 1.

The iron 1 depends from a carriage 2 adapted to be moved in known manner transversely of the table 3, in a supporting arm frame 4. By means of rollers such as 5, 6, said supporting arm frame may travel longitudinally along a guide comprising channel bars 7, 8, 9. Secured to said frame 4 is an electric motor 10, driving through the belt 11 a pulley 12. Said pulley 12 which is hollow (see Fig. 2) is rigidly attached to or made integral with a friction wheel or roller 13 adapted to roll along one or other of two tracks or running surfaces 14 and 15 on the channel bars 8 and 9 respectively of the guide. In this manner reverse motion of the supporting frame may be obtained.

In order to enable the operator to bring the driving wheel 13, at will, into contact with one or other of the tracks, the shaft of the pulley 12 is mounted as shown in the Figures 2 and 3 of the drawings, that is to say, the pulley 12 which is hollow as shown and the driving wheel 13 which is also hollow form together one body, rotatable upon a central shaft 16 which is fixed in a crosshead 17, having two pivots 18, 19 located in bearings in the arms 20, 21. The arms are fixed upon a second shaft 22, the ends of which are secured in the supporting frame 4. Upon the pivot 19 is fixed a crank 23 which may be connected, in any desired way, to a handle under the control of the operator. By moving said crank upwardly or downwardly in the direction of the arrow 24 (Fig. 1) the cross head 17 will be rotated one way or the other thus causing the shaft 16, fixed in said crosshead, to tilt in a plane perpendicular to the tracks 14 and 15.

In order to be able to adjust the driving wheel or roller 13 in respect to the tracks the shaft 22 and the arms 20, 21, are arranged as shown. On loosening the nut 25, the shaft 22 may be slightly rotated one way or the other so as to give the pivots 18, 19 the correct position.

At the end of the shaft 16 a roller 26 is mounted so as to be freely rotatable about its spindle 27. At each end of the table the channel bars 8 and 9 of the guide are provided with short strips or ramps, such as 28, shown in Fig. 1, for said roller. There would be a ramp 28 depending from the bar 9 and a ramp 28 on the bar 8, so that, as soon as the frame reaches one end of its travel, the roller 26 will contact with the strip or ramp 28 at that end and the shaft 16 with the driving wheel be slightly lifted (or pressed down as the case may be) in such a way that the driving wheel or roller will be held just clear of its tracks (14, 15) and therefore the frame be stopped automatically against further travel.

It will be seen the pulley, the wheel or roller 13 and the roller 26 are all concentrically arranged about the shaft 16.

It will be clear the invention is not restricted to machines driven by an electric motor fixed to the support frame as the frame may be operated by transmission gearing.

Other power means than a belt may be used for driving the pulley 12.

I claim:—

An ironing machine comprising an iron, a table, a pair of tracks fixed adjacent thereto, a frame supporting the iron and having a shaft fixed therein parallel with said tracks, arms fixed to the shaft, a crosshead journalled in the arms, a second shaft fixed to the crosshead in a plane perpendicular to said tracks, a pulley on said second shaft, means for rotating the pulley, a wheel in the plane of and between the tracks and fixed to the pulley, means for rotating the crosshead to alternatively move the wheel into engagement with either of the tracks for moving the frame, and thus the iron with respect to the table during rotation of the pulley and wheel.

In testimony whereof I affix my signature.

HERMANUS FRANCISCUS TOL.